United States Patent [19]
Hall et al.

[11] 3,717,414
[45] Feb. 20, 1973

[54] AREA MEASURING MACHINES

[75] Inventors: Clifford Hall, Wakefield; John E. Holdsworth, Dacre, both of England

[73] Assignee: USM Corporation, Boston, Mass.

[22] Filed: May 12, 1971

[21] Appl. No.: 142,591

[52] U.S. Cl. ............356/158, 33/123, 250/219 WD
[51] Int. Cl. ......G01b 7/32, G01b 11/28, G01n 21/30
[58] Field of Search ................33/123; 356/157, 158; 250/219 WD, 222

[56] References Cited

UNITED STATES PATENTS

| | | | |
|---|---|---|---|
| 2,356,761 | 8/1944 | Jones et al. | 356/158 |
| 3,264,739 | 8/1966 | Berlinsky et al. | 33/123 |

Primary Examiner—Archie R. Borchelt
Assistant Examiner—T. N. Grigsby
Attorney—Richard A. Wise, Richard B. Megley and Howard R. Berkenstock, Jr.

[57] ABSTRACT

Apparatus for measuring the superficial area of a workpiece such as a hide wherein the hide to be measured is supported by a glass roll within which is an elongated light source and cooperating therewith are a plurality of measuring wheels each disposed on an axis parallel to said roll and having regular holes around the periphery thereof, each wheel having a photoelectric cell therein aligned with said light source to activate a summing circuit upon the presence of a hide between said light source and said cell and wherein said summing circuit includes a second light source and a plurality of photoelectric cells with said wheels so aligned as to provide a signal to s said summing circuit upon each occurrence of a measuring wheel rotating a unit amount.

7 Claims, 4 Drawing Figures

Inventors
Clifford Hall
John E. Holdsworth
By their Attorney

AREA MEASURING MACHINES

BACKGROUND OF THE INVENTION

This invention is concerned with improvements in or relating to area measuring machines. Particularly, the invention is suited to measuring the superficial area of an irregular sheet workpiece such as a hide.

One type of area measuring machine which has been in use for a considerable period of time and has proved reasonably successful includes support means comprising rollers, all of the same diameter, rotatable about a common axis for supporting sheet material the area of which is to be measured. The apparatus also includes a plurality of wheels disposed side by side across the machine and arranged to run without slipping on sheet material fed past the wheels through a 'nip' between the wheels and rollers. Each of the wheels is rotatable about an axis parallel with the axis of the rollers. These conventional machines further include mechanical detecting means associated with each wheel for sensing the presence of a piece of sheet material being fed past the wheel such as pins radially mounted at regular intervals round the periphery of the wheel. These pins usually are slidable radially and communicate with signaling and summing means for recording each time a sheet has been rotated a unit amount by the passage of sheet material. The summing means generally includes a system of worms, worm wheels and levers by which a pointer is moved mechanically to indicate the area of a piece of leather. This type of machine is commonly known as a "pin wheel" machine.

Such a machine is operated by feeding the material to be measured between the rollers and wheels. The rollers may be driven to feed the material through the machine. The wheels rotate by the friction contact of the material and the wheels. As a piece of material passes beneath one of the wheels, the pins contact it and are pushed radially inwardly so that an inner end portion contacts a member at the end of a rod and rotates the rod and associated worm and worm wheel to move the indicating levers. As the pins of each pin wheel are spaced equally from the pins in adjacent pin wheels each lever movement operated by one pin is equivalent to a unit amount of area. While such a pin wheel machine operates fairly efficiently, it suffers from a tendency to record an area less than the actual area of the workpiece. Movement of the lever system is brought about by frictional contact between the wheels and material and, even though the lever system is balanced, it tends to create a resistance to turning of a wheel when a pin strikes the rod member. The problem of under recording is particularly troublesome during long periods of maintenance neglect to which such machines are commonly subject. Moreover, the manufacture and construction of the pin wheels, worm and lever system of such a machine is complex, resulting in an expensive, delicate apparatus. The continual adjustment of the machine after construction to ensure that as little force from the pin wheels as possible is needed to operate it and to ensure that each operation of the lever system causes accurate movement of the pointer to indicate unit area is time consuming and expensive.

One of the various objects of the present invention is to provide an improved area measuring machine which will eliminate or minimize these problems.

SUMMARY OF THE INVENTION

In accordance with the above object to fulfill existing industrial need, certain of the features of our invention are described. By way of example, our electronic area measuring machine includes roller support means such as a glass tube transparent to a radiation source. This tube supports sheet material the area of which is to be measured as it traverses the machine. The apparatus further includes a plurality of wheels disposed side by side across the machine for rotation about axes, above and parallel to the axis of rotation of the roller and arranged to run in the operation of the machine without slipping on sheet material fed past the wheels on the roller. Each of the wheels is generally opaque and has a plurality of portions adapted to permit passage of a beam of radiation rays, as by holes, each of similar dimension. The center of each of these holes is regularly spaced around the periphery of the wheel. Detecting means having a radiation source (viz., a light source and a photoelectric cell) is associated with each wheel and is disposed at either side of the path of travel of sheet material through the machine. The radiation source is arranged to first direct a beam through a first region to the photocell so that the presence of a piece of sheet material between the roller and wheel breaks the beam. The beam, thus, can reach the detector only through one of the holes in the first region. The illustrative machine further includes signaling means for signaling each occurrence of each wheel being rotated a unit amount, viz., the distance between the center of the holes of a wheel. This signaling means may include sampling means for each wheel arranged to collect the output of each of the detecting means on each occurrence of one of the holes becoming aligned with a second radiation source and detector. This detecting means may then transmit a signal to be summed to summing means of the illustrative machine should the output of the detecting means indicate that the beam from the light source to the photoelectric cell be broken by sheet material. In such manner, the apparatus may record the area of the workpiece.

The above and other of the various objects and several features of the present invention will become more clear from the following description, to be read with reference to the accompanying drawings. It should be realized that this illustrative machine has been selected for description to illustrate the invention by way of example and not of limitation of the invention.

DESCRIPTION OF THE PREFERRED EMBODIMENTS

Figure 1:
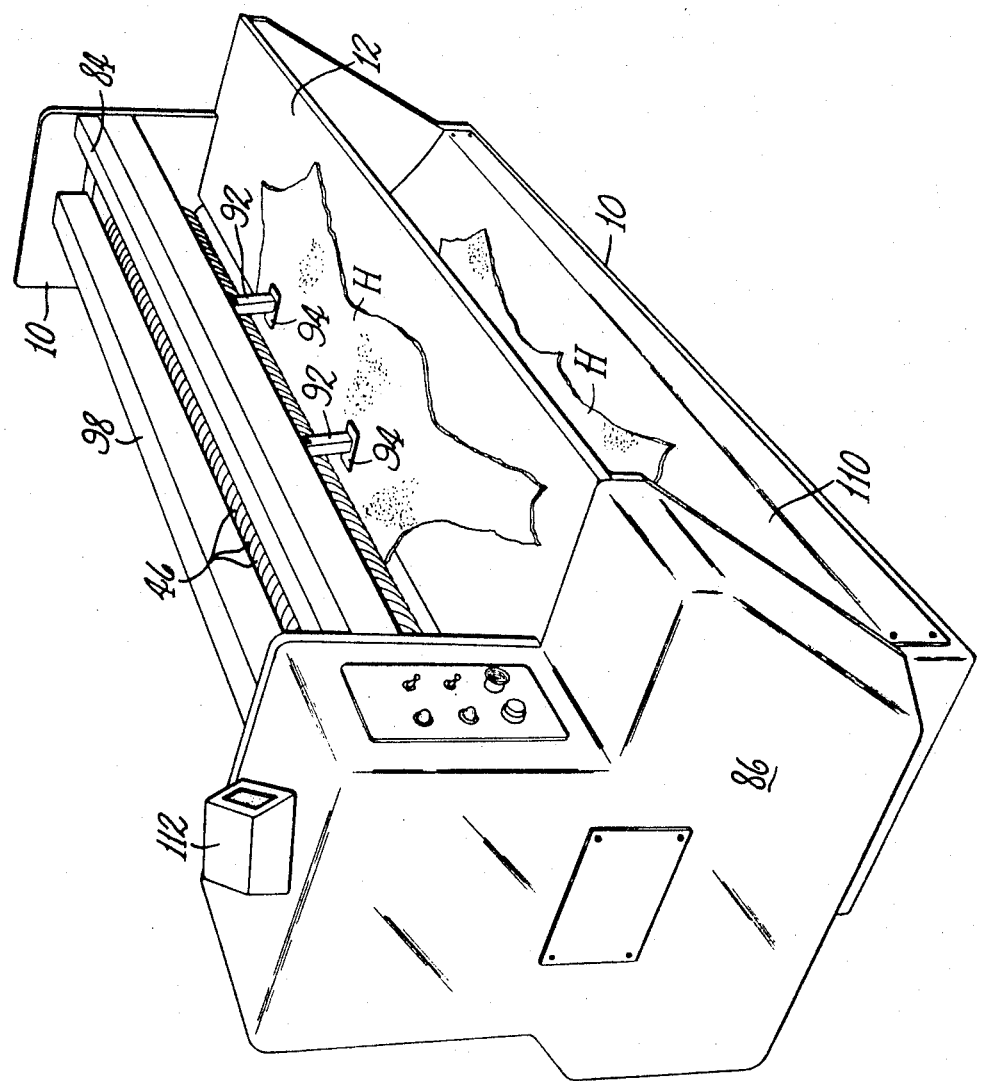
FIG. 1 is a perspective view of the illustrative area measuring machine.
Figure 2:
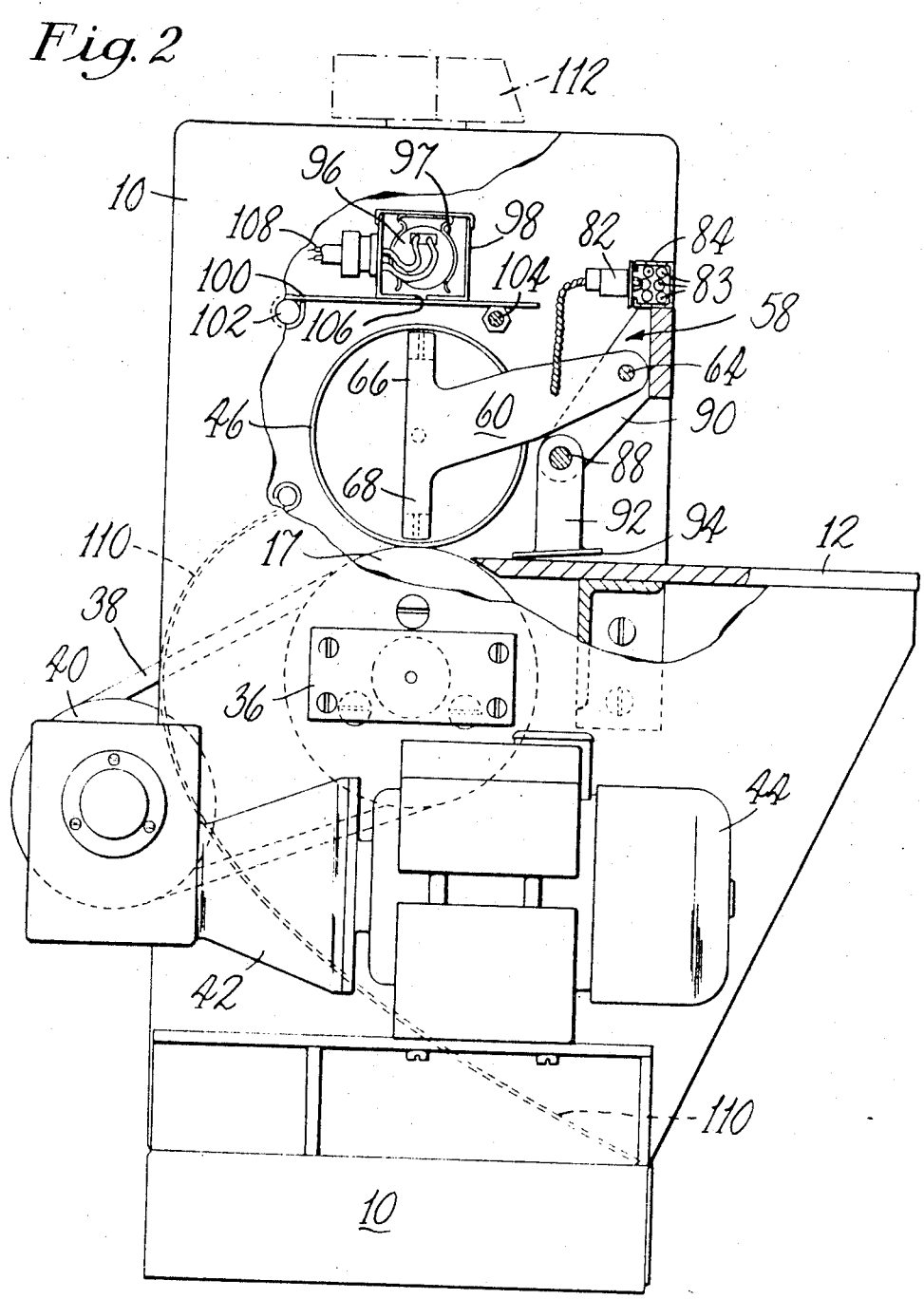
FIG. 2 is an end view, with parts broken away, of the illustrative machine.

Referring now to the drawings, and FIGS. 1 and 2 in particular, the illustrative area measuring machine includes a frame 10 having a feed table 12 on which a workpiece such as a hide H, the area of which is to be measured, may be supported for feeding into the machine. A cylindrical tube 14 of a material such as glass, transparent to a radiation source, is mounted for rotation in the frame 10 with an uppermost portion of the tube substantially in alignment with an upper surface of the feed table 12 (see FIG. 2).

Figure 3:
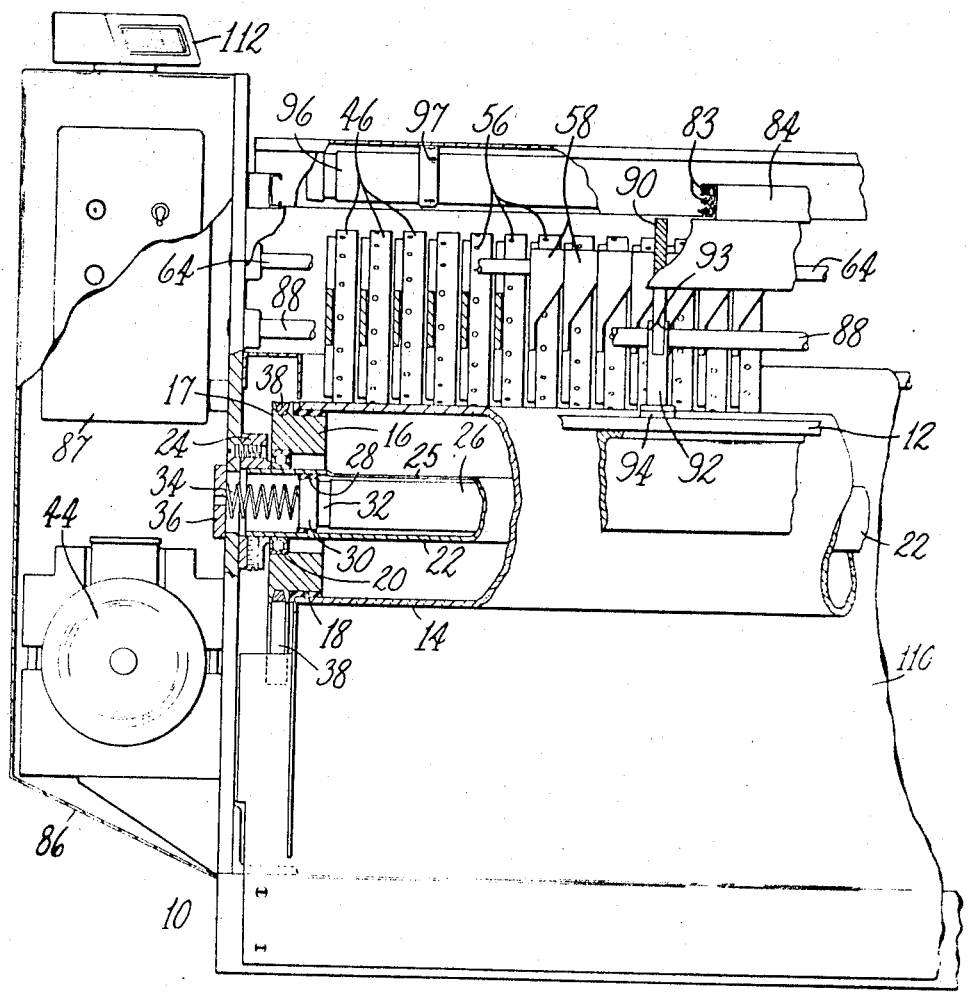
FIG. 3 is a front view of part of the illustrative machine, partly in section and with parts broken away.
Figure 4:
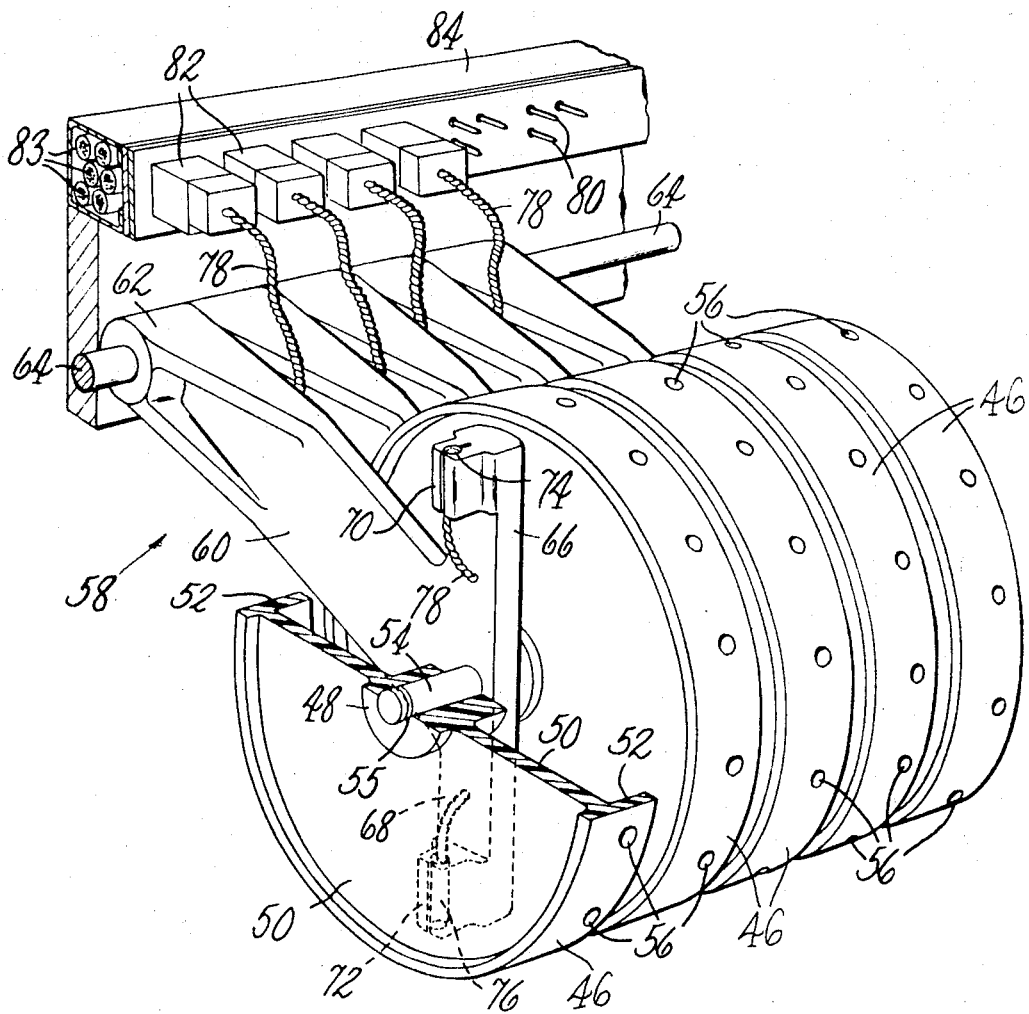
FIG. 4 is a perspective view, with parts broken away, of wheels of the illustrative machine.

Tube 14 is supported at opposite ends by means such as end plugs 16 (only one visible in FIG. 3) secured to tube 14 by a seal 18. End plugs 16 are mounted for rotation on bearings 20 (only one visible in the drawings) supported on portions of a tube 22 of a material non-transparent to a radiation source, such as steel, coaxial with the tube 14. Tube 22 is mounted on the frame 10 by housing collars 24 (only one visible in the drawings) secured to the frame 10. Tube 22 has a slot 25 extending along its length between end plugs 16 and facing upwardly. A radiation source, such as fluorescent light tube 26 is mounted in tube 22, the operative part of the light tube 26 being as long as the slot 25. Rubber collars 28 (only one visible in the drawings) are fixed on plastic plug portions 30 (only one visible in the drawings) into which plug portions (not shown) of metal end caps 32 of the light tube 26 are plugged. Collars 28 may be slidingly fitted into the tube 22 and resiliently support the light tube 26 in a spaced relation from the steel tube. The light tube 26 is resiliently centralized in the tube 22 by springs 34 (only one visible in the drawings) housed in steel tube 22 and acting between the plastic plug portion 30 and end plates 36 (only one visible in drawings) which are secured to the frame 10. Wires (not shown) lead from electrical means of the illustrative machine to plastic plug portion 30 and thence via the plug portions of end caps 32 to light tube 26 to supply electricity to the light tube 26 to illuminate it.

A left hand one of the end plugs 16 comprises a pulley portion 17 (see FIG. 3) about which a drive belt 38 passes. Drive belt 38 also passes round a pulley 40 arranged to be driven in the operation of the illustrative machine through a gearbox 42 by an electric motor 44. Tube 14 is thus rotated in the operation of the illustrative machine.

A plurality of wheels 46 are mounted in the illustrative machine for rotation about axes parallel with the axis of rotation of the tube 14 and with a portion of the periphery of the wheels in contact with the tube 14 (when there is no hide H to be measured in the machine). All of the wheels 46 are similar in construction, are mounted in similar manner and each has similar electrical apparatus, subsequently described, associated therewith. For convenience, therefore, only one of the wheels 46, its mounting and electrical apparatus will be described in detail.

Wheel 46 is a material non-transparent to the light source 26, such as an injection molded black plastic, and includes a central boss 48 connected by a web portion 50 to a rim portion 52 having a cylindrical outer surface. Holes 56, all of substantially the same size, are disposed the rim portion 52 spaced regularly, such as at 1-inch centers. The circumferential dimension of the rim portion 52 is such that the holes 56 may be so regularly spaced. Thus, in the illustrated embodiment, the circumference of the wheel 46 is divided by the holes 56 into 1-inch lengths. Wheel 46 is mounted for rotation on an axle 54 projecting from a support member 58 and received in a hole in the boss 48, the wheel 46 being retained on the axle 54 by means (not shown) received in a groove 55. Axle 54 is disposed parallel to the axis of rotation of the glass tube 14.

Support member 58 is conveniently T-shaped and includes a limb 60 and end portion 62 which is pivotally mounted on a rod 64 disposed in the frame 10. Rod 64 extends across the illustrative machine parallel with the axis of rotation of the glass tube 14 so that the member 58 may be pivoted about the rod 64. Limb 60 is mounted to extend rearwardly and slightly downwardly from the rod 64. From a rear end portion of the limb 60, limbs 66 and 68 project somewhat normally, forming the T-shape. Limb 66 has a pocket 70 at an upper end portion thereof in which an upper radiation responsive device 74, such as photoelectric cell, is mounted. Limb 68 has a pocket 72 at a lower end portion thereof in which a lower such device (photoelectric cell) 76 is mounted. The construction and arrangement of the wheel 46 and support member 58 are such that operative portions of the photoelectric cells 74, 76 are in alignment with the path described by the holes 56 as the wheel 46 is rotated. The positioning of the photoelectric cells 74, 76 relative to each other is such that when the operative portion of the photoelectric cell 76 is in alignment with one of the holes 56, light from tube 26 may pass through the slot 25 in tube 22 and fall on the operative portion of the photoelectric cell 76. Photoelectric cell 76 is similarly in alignment with another of the holes 56 so that light from another light source, subsequently described, may periodically pass through the hole 56 and illuminate said cell 76.

As previously mentioned, each of wheels 46 is similar, and similarly mounted on a like support member 58. Likewise, each of the wheels has an upper and a lower photoelectric cell 74 and 76 associated therewith. Cells 74 and 76 are connected by wires 78 with socket members 82 (one socket member being provided for each support member) received on plug members 80 projecting from a frame member 84 extending across the illustrative machine. The output from the photoelectric cells is fed through the wires 78, socket members 82 and plug members 80 to wires 83 housed in a frame member 84 and thence to an electronic computing device 87 (operating electronically by known means) housed in a box portion 86 of the frame 10.

Wheels 46 are so spaced apart that the center of each of the paths described by the holes 56 as the wheels 46 rotate is spaced one inch from the center of the adjacent paths. Rim portions 52 of the wheels, however, are only slightly spaced one from the next. Wheels 46 normally rest (when the illustrative machine is not in use) in contact with the glass tube 14 (see FIGS. 2 and 3). When the wheels 46 are in contact with the glass tube, the axles 54 are coaxial.

A rod 88 is also mounted in the frame 10 and is supported at intervals by brackets 90 (only one visible in the drawings) which also assist in supporting the rod 64. Two clamping members 92 are mounted on the rod 88 each having at upper end portions thereof projections 93, one at either side of one of the brackets 90 (see FIG. 3) in sliding contact therewith. The clamping members 92 each comprise a curved foot portion 94 disposed adjacent the upper surface of the feed table 12 (see FIG. 2) such that hide H may be fed rearwardly between one of the foot portions 94 and table 12 (the clamping member 92 rotating in a clockwise sense viewing FIG. 2 to permit such passage) but may not be fed forwardly from between the foot portion 94 and table 12. This is so since the clamping member 92 tends to rotate in a counterclockwise sense and the hide H is thus trapped between the foot portion 94 and the table 12. This militates against the material being partially withdrawn from the illustrative machine and fed through again, so giving a false reading.

An upper radiate source such as fluorescent light tube 96 is mounted in the illustrative machine above the upper photoelectric cells 74 and extends across the machine. The light tube 96 is mounted in a metal tube 98 of rectangular cross section from which it is spaced by clips 97. Tube 98 is supported at either end by supports 100 (only one of which is visible in FIG. 2), rear portions of each of which are pivotally mounted on studs 102 (only one visible in the drawings) and front portions of which rest on projections 104 carried by the frame 10. A slot 106 is cut in a lower portion of the tube 98 and extends across the illustrative machine parallel with slot 25. Slot 106 is disposed in alignment with the upper photoelectric cells 74 so that when one of the holes 56 in the wheels 46 is in alignment with the operative portion of one of the upper photoelectric cells, light from the light tube 96 may shine through the slot in the metal tube 98 and this hole 56 onto the operative portion. Tube 96 is connected to an electrical supply by wires 108. For convenience, the metal tube 98 carrying the light tube 96 may be swung about the studs 102 (in a counterclockwise sense viewing FIG. 2) so that the ends of the tube 98 are clear of the frame 10, thus to permit replacement of the light tube 96.

In the preferred embodiment of the invention a sheet metal chute 110 is mounted on a rear portion of the frame 10 so that hide H fed between the wheels 46 and glass tube 14 is deflected downwardly and forwardly by the chute 110 so that the hide H leaves the illustrative machine through an opening in a lower front portion of the illustrative machine beneath the table 12. It is preferred that chute 110 be removable should it be desired that the machine be used as a through feed machine in which case the hide H is ejected at the rear of the machine.

A felt pad (not shown) may be provided extending the length of the glass tube 14 (clear of the light tubes 26, 96) and bearing on the tube 14 to wipe the glass tube 14 as it rotates. Such a pad may wipe dirt from the tube 14 so that the passage of light through the tube 14 is not impeded and the risk of dirt being transferred to the leather hide H is reduced.

In operation of the illustrative machine, electrical power is first switched on, illuminating the light tubes 26 and 96, powering the electronic computing device 87 and starting the electric motor 44 to rotate the glass tube 14 at a suitable speed. The wheels 46 rest lightly on the glass tube 14 and are rotated by frictional forces between the wheels 46 and tube 14. As each of the wheels 46 rotates in contact with the glass tube 14, light from the light tube 96 activates the upper photoelectric cell 74 associated with the wheel every time one of the holes 56 in the wheel comes into alignment with the photoelectric cell and causes an impulse which is transmitted via the wires 78, 83 to the computing device 87. Simultaneously with the foregoing, light from the tube 26 falls on the associated lower photoelectric cell 76 when another of the holes 56 comes into alignment with the lower cell and causes an impulse from the lower cell to be transmitted to the computing device 87. When these two impulses from the upper and lower photoelectric cells associated with one of the wheels 46 reach the computing device 87, no "count" is recorded. Should one of the wheels 46 slip on the glass tube 14, no false "count" is recorded as the counting is not dependent on the rate of feed through the machine.

When the area of a piece H of leather of irregular shape is to be measured, the hide H is laid on the table 12, pushed by an operator rearwardly on the table 12 beneath the foot portions 94 of the clamping members 92 and into the "nip" between the wheels 46 and glass tube 14. Certain of the wheels 46, beneath which hide H is fed, are lifted slightly (the support members 58 pivoting about the rod 64) by the piece as it is fed into the nip, but not sufficiently, to move the photoelectric cells out of alignment with the light emitted by the light tubes 26, 96 through the slots 24, 106. The remainder of the wheels 46 (those beneath which the piece does not pass) continue to run on the glass tube 14 and no recorded "counts" originate from these wheels. The frictional force applied to the hide H by the glass tube 14 as it rotates is sufficient to pull high H through with little or no assistance from the operator. Wheels 46, beneath which the hide H passes and which are resting thereon, are rotated by frictional contact between the uppermost surface of hide H and the wheels 46. It is important that little or no slipping takes place between the wheels 46 and this uppermost surface, otherwise a low reading for the area of the piece will be recorded. For this reason it is important to select the particular material of the wheels and the force with which they rest on the piece so as to minimize the risk of slipping.

As the wheels 46 resting on hide H rotate, light from the tube 96 still illuminates the upper cells as each of the holes 56 passes. Such illumination causes impulses from the upper cells to be passed to the computing device 87. However, no corresponding impulses are received from the lower cells because the hide H prevents passage of light from the light tube 26 to the lower cells. The counting device thus receives an impulse from the upper cells but none from the lower cells and each impulse from the upper cells is "counted" and recorded when no impulse is received from the lower cells. Each such recorded impulse represents the rotation of one of the wheels 46 by the distance between the holes, viz., 1 inch, and as the wheels are 1 inch apart this may be considered to represent an area of one square inch. The sum of such impulses thus represents the total area of the piece of leather in square inches. The computing device 87 is arranged to sum all such impulses and to divide the sum by a suitable factor so that sum is accumulated in a store of the computing device for presentation to an indicating device 112 on which the area of the piece is displayed in the desired units.

While the wheels 46 may rotate freely on the axles 54 and thus the holes 56 may be illuminated at random, it is possible that several impulses may be received by the computing device 87 at once. Conventional computing devices cannot "count" multiple impulses arriving simultaneously. To avoid some impulses not being counted (and thus a low area being recorded for the hide H), the computing device 87 is arranged to sequentially scan the outputs from each pair of upper and lower photoelectric cells one after another, for example, 1000 times per second, so that only one impulse from one of the wheels 46 is received at once. The frequency with which each pair of cells is scanned is chosen such that the duration of an impulse is long compared with the time interval between successive scannings of the pair of cells.

As previously mentioned, the computing device comprises a store in which a record of the area of the hide H is stored. The computing device is so arranged that when the trailing edge of a hide H passes from the nip (and thus no impulses are counted), the record of the area is passed from the store to the indicator device 112. The store is then cleared for reception of the record of the area of the next piece of leather to be measured. The area of the just measured hide H remains displayed until the trailing edge of the next piece of leather passes the wheels. The record of the area of a successive piece is then transferred from the store to the indicator which then cancels the display of the area of the previously measured hide H.

Should the hide H have a number of folds, an operator may spread a fold out as it is passed through the illustrative machine to ensure the area measured includes the area of the leather in the fold. This frequently entails the stopping of the feeding of part of the leather through the illustrative machine. This, however, is easily accomplished since the glass tube 14 slips easily on the hide H. As previously mentioned, the clamping member militates against the hide being moved forwardly and some of the area thereby being recorded twice. The hide H is finally directed by the chute 110 forwardly out of the illustrative machine.

Having thus described our invention, what we claim as new and desire to secure by Letters Patent of the United States is:

1. In a machine for measuring the superficial area of sheet material workpieces having a multiplicity of measuring wheels extending across the width of said machine and a power-driven feed roll for carrying said workpieces beneath said wheels, the improvement including detecting means associated with each of said wheels for detecting the presence of a workpiece to be measured and subsequently measuring per unit amounts of said workpiece passing each of said wheels comprising a radiation source disposed on one side of said workpiece, a plurality of radiation detectors each associated with one of said measuring wheels and disposed opposite said radiation source and aligned with a radiation beam thereof so that said workpiece between said source and detector interrupts the radiation beam therebetween, said measuring wheels including a circumferential substantially opaque portion having therein transparent portions at regular intervals around said circumference and said wheels are so disposed that said circumferential portions are interposed between said radiation source and associated detectors, signaling means signaling each occurrence of each wheel being rotated a predetermined unit amount when said associated detector indicates said workpiece is interposed between said radiation source and said associated detector, and summing means actuated by said signal means to register the sum of the occurrences of activation of said signaling means.

2. In apparatus according to claim 1 the improvement wherein said signaling means includes a second radiation detector associated with each measuring wheel, a radiation source so disposed that the said circumferential portion of said measuring wheel is interposed between said second detector and said second radiation source whereby rotation of said measuring wheel a unit amount is signaled responsive to passage of the transparent portions of said measuring wheels between said second radiation source and second detector.

3. Apparatus according to claim 2 wherein said radiation sources are sources of visible light and said detectors are photoelectric cells.

4. Apparatus according to claim 3 wherein said light source is enclosed in a casing and is directed through a slot therein at said associated photoelectric cell.

5. Apparatus according to claim 4 wherein said power-driven feed roll is a transparent tubular roller arranged to be rotated in the operation of said machine about an axis parallel to the axes of rotation of said measuring wheels to feed the material therethrough and within which said first light source is housed.

6. Apparatus according to claim 5 wherein said signaling means includes scanning means whereby only one pulse at a time is communicated to said summing means.

7. Apparatus according to claim 6 wherein said summing means includes indicator means for storing the area of the measured workpiece until the area of the next succeeding workpiece traversing said machine is summed.

* * * * *